United States Patent

[11] 3,627,231

| | | |
|---|---|---|
| [72] | Inventor | Clement H. Kalthoff<br>Boulder, Colo. |
| [21] | Appl. No. | 54,710 |
| [22] | Filed | July 14, 1970 |
| [45] | Patented | Dec. 14, 1971 |
| [73] | Assignee | International Business Machines<br>Corporation<br>Armonk, N.Y. |

[54] ARTICLE CARRIER TRANSFER AND TRACKING SYSTEMS
9 Claims, 12 Drawing Figs.

[52] U.S. Cl. .................................................. 243/16, 243/36
[51] Int. Cl. ..................................................... B65g 51/04, B65g 51/36
[50] Field of Search ........................................ 243/1, 2, 9, 16, 19, 36

[56] References Cited
UNITED STATES PATENTS
3,361,384  1/1968  Thorburn ...................... 243/16

Primary Examiner—Joseph Wegbreit
Assistant Examiner—I. Kenneth Silverman
Attorneys—Hanifin and Jancin and Herbert F. Somermeyer ABSTRACT: An article in a carrier, such as magnetic media, is pneumatically dispatched through an incoming pneumatic tube to an automatic carrier terminal. The carrier is automatically unloaded with the article being processed. Upon completion of the processing, the carrier terminal supplies the carrier with the article therein through an outgoing tube to be picked up by a carrier exchanging system. The carrier is tracked throughout the dispatch system. A status byte is generated and memorized which indicates location of every carrier in a system. This tracking system is applicable not only to pneumatic dispatch systems but to other article carrying systems as well. A plurality of dispatch systems operate with one carrier exchanging system. A common control circuit controls article processing, the carrier exchanging system, the automatic carrier terminals and pneumatic dispatching.

INVENTOR
CLEMENT H. KALTHOFF

ATTORNEY

STATUS · 00101000

ARTICLE CARRIER TRANSFER AND TRACKING SYSTEMS

BACKGROUND OF THE INVENTION

This invention relates to article tracking and transfer systems and more particularly to pneumatic dispatch systems and to tracking systems having memory capabilities.

In data processing, it is becoming more popular to automatically process record-bearing media such as films, magnetic media, punched cards, etc. Library arrays of cartridges or carriers each carrying at least one such record article have been utilized in the past. An accessing mechanism obtains the carrier and transfers it to an article processing station, such as a card reader, tape or other magnetic media handler, film developer and the like. An example of such a library is shown in the Burke et al. U.S. Pat. No. 2,941,738. A pneumatic dispatch system, usable with a media library, is shown by Junge et al. in U.S. Pat. No. 3,288,393. Extensions of the inventive library concept disclosed by Burke et al. require additional carrier transfer systems for moving the carrier or cartridge from the array to a remotely located article processor. Such transfer systems can become quite complex especially if more than one carrier is moving at a given instant of time. To limit the number of carriers being transferred at a given time may unnecessarily limit the performance capability of the library system.

SUMMARY OF THE INVENTION

It is an object of the present invention to provide an improve article transfer system having tracking characteristics and which is fully automatic.

In accordance with preferred aspects of the present invention, an article carrier is pneumatically urged from an input portion of an incoming tube to an automatic carrier terminal. The terminal receives the carrier, opens it and permits an article processor to automatically process the article. The article may consist of a flexible magnetic media (strip or tape) that is automatically removed from the carrier and recorded upon or read from by the article processor. Upon completion of the article processing, the carrier terminal is instructed to remove the carrier. It does so through an outgoing tube to an output portion, whereupon a carrier exchange system moves the carrier to a selected location.

A plurality of pneumatic dispatch systems are in communication with a carrier exchanging system. Each of the pneumatic dispatch systems receives its pneumatic supply from the associated article processor. This arrangement is in contradistinction to prior art systems wherein a central blower provides a pneumatic supply for plurality of pneumatic tube branches.

In addition to effecting pneumatic dispatch, the blower also performs a nondispatch function in the processes; such as cooling a drive motor, supplying vacuum used in the terminal for article processing, and the like.

Since the system may be used in high performance media libraries, a carrier tracking system is incorporated. The path of travel of the carrier is divided into segments. As soon as a carrier enters a segment, a latch is set. Irrespective of the power supplied to the system, the latch is maintained in the set state indicating a carrier in its segment; that is, in case of power failure, the latch maintains its indication. Also, when the system is closed down; for example, at night, the carriers can be any where in the system with the latches memorizing their present location. During restart or startup operations, such latches indicate to control circuits the presence of carriers in the dispatch system. Then during initialization by control circuits, such carriers are handled efficiently without a system search. A downstream latch, when actuated, resets an upstream latch for indicating that the carrier has left one segment and has entered another.

The foregoing and other objects, features, and advantages of the invention will be apparent from the following more particular description of preferred embodiments of the invention, as illustrated in the accompanying drawings.

DETAILED DESCRIPTION

Referring now more particularly to the drawings, like numerals indicate like parts and structural features in the various diagrams and views. The present invention is illustrated as being incorporated into a magnetic media library system shown in FIG. 1. Flexible information-bearing magnetic media is the article carried by each cartridge or carrier. A large plurality of such carriers are stored in an X–Y array 10 of compartments which are selectively accessed through carrier exchanging system 11. The principles set forth in the Burke et al. patent, supra, may be used in constructing the carrier exchanging system. Some of the compartments in storage array 10 serve as input and output portions in pneumatic dispatch systems 12, 13 and 14. These systems are respectively connected to automatic terminals and processors, 15, 16, and 17. For brevity, only the details of pneumatic dispatch system 13 are shown, it being understood that systems 12 and 14 may be constructed in a like manner. The library operation is supervised by control circuits 20 which have cable connections to the automatic terminal processors as well as to the carrier exchanging system.

Additionally, each article processor has its own logic controls to effect transfer of carriers through the pneumatic dispatch systems and the associated automatic terminals. Many of the pneumatic dispatch functions performed are responsive to the position of carriers within the pneumatic dispatch systems and the terminals.

Figure 1:
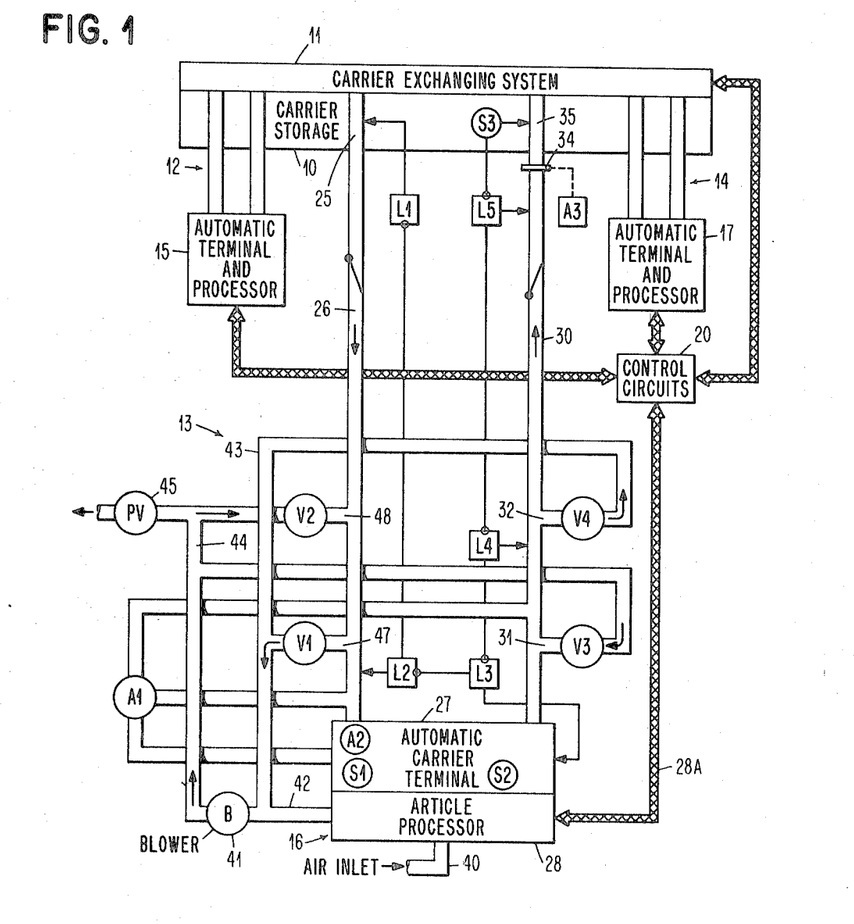
FIG. 1 is a simplified block diagram of a flexible magnetic media library using several carrier systems each using the present invention.

Each carrier is individually tracked when traveling in any of the dispatch systems. In this regard, system 13 mechanical latches L1–L5 and sensing units S1–S3 yield an unambiguous indication of the location of up to three carriers. Five bits of sense information in L1–L5 are used, as later explained, in starting the library system. Latch L1 senses and memorizes that a carrier has been inserted into input portion 25 of incoming tube 26. When the inserted carrier arrives at the terminal end of tube 26, latch L2 is actuated. At this time, latch L1 is released indicating the carrier has arrived at the end of the tube and is ready to be inserted into terminal 27. Within terminal 27, sensors S1 and S2 momentarily track the carrier to a work position. At the work position 87, latch L3 is actuated which then resets latch L2. L3 being activated indicates that an article therein may be undergoing processing by processor 28. Even upon completion of processing, the carrier resides in the work position until processor 28 initiates an unload operation. The carrier is then automatically returned through output tube 30 which sets latch L4 and resets latch L3. The carrier is pneumatically urged to point 33 in front of sliding gate 34. Latch L5 is set and latch L4 is reset to indicate that a carrier is ready to be placed into output portion 35 of outgoing tube 30. Then, actuator A3 automatically opens gate 34 and continuing pneumatic pressure urges the carrier into the output portion. Sensor S3 senses and indicates to control circuits 20 that the carrier is ready to be exchanged to another compartment within array 10. Simultaneously, a signal from S3 resets latch L5 and removes pneumatic pressure. This action completes travel of one carrier through pneumatic dispatch system 13. The other systems 12 and 14 operate in an identical manner.

A plurality of carriers may be simultaneously handled. For example, a carrier may be actuating latch L2 which another carrier is being inserted into input portion 25. Also at the same time, a third carrier may be in a work position within terminal 27 while a fourth carrier resides in output portion 35. However, for control circuit simplicity, it is preferred that each dispatch system be limited to three carriers at a time.

The pneumatic supply for each dispatch system includes inlet 40 into the respective article processors. In the processor, a motor is cooled by the incoming air and then exhausted by blower 41 from vacuum line 42. Other nondispatch functions may be performed. The vacuum or pulling portion of the pneumatic dispatch system includes vacuum manifold 43 which is in fluid communicative relationship with line 42. The push or pressure side of the pneumatic dispatch system is on the outlet side of blower 41 and includes pressure manifold 44. The outlet pressure is regulated by pressure regulating valve 45.

Pneumatic dispatch controlling valves V1–V4 are respectively in fluid communication relationship to ports 31, 32, 47 and 48 in the dispatch tubes 26 and 30. When latch L1 is set, and no carrier is at latch L2, the later-described control circuits simultaneously open valves V1 and V3 and close valves V2 and V4. This causes airflow through valve V1 from incoming tube 26 thereby pulling the carrier from input portion 25 to the end of its tube. Simultaneously, pressure is applied from blower 41 through valve V3 causing airflow from port 31 toward output portion 35. If a carrier is at position L4, it is pushed to position L5. Valve V3 is maintained open until gate 34 has been opened and carrier has actuated sensor S3 at which time, valves V1 and V3 are both closed. If there is no carrier in the outgoing tube, then the arrival of the carrier at L2 closes valves V1 and V3.

To insert the carrier into terminal 27, valves V2 and V4 are simultaneously opened while valves V1 and V3 are closed. Valve V2 passes pneumatic pressure through port 48 urging the carrier into terminal 27. Simultaneously therewith, vacuum is applied through valve V4 pulling any carrier in terminal 27 into outgoing tube 30. As later described, a single gate controls access between terminal 27 and the pneumatic tubes.

Operation of Pneumatic Dispatch System 13

Figure 2:
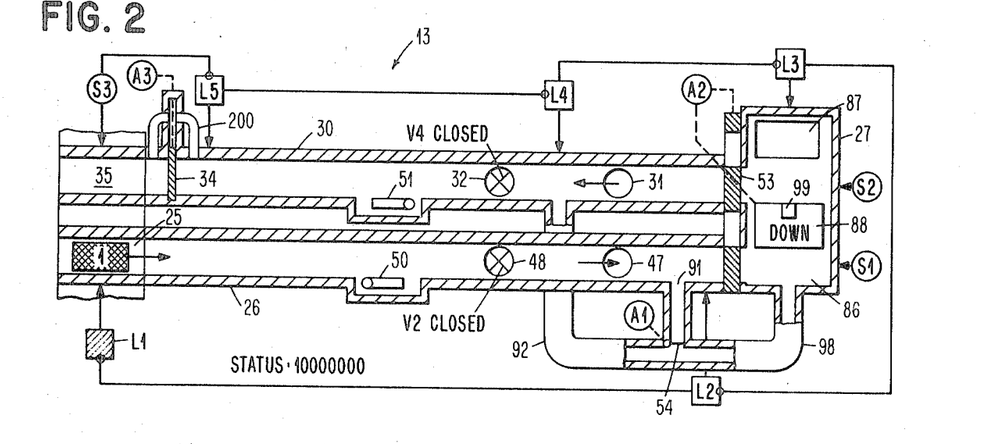
FIGS. 2–8 are simplified diagrammatic illustrations of a pneumatic dispatch portion of the FIG. 1 system showing various operational status when two carriers are being transported through the system.

A more detailed understanding of pneumatic transport is gained by referring to FIG. 2 which is a more detailed diagrammatic showing of pneumatic dispatch system 13. FIGS. 3–8 are identical to FIG. 2 except that the operational status is changed in accordance with the location of carriers within pneumatic dispatch system 13. The status byte in each figure is described in a later section. These several figures clearly illustrate the transport of multiple carriers through the pneumatic dispatch system. A first carrier, identified by the cross-hatched box with the encircled 1 therein, is first inserted into the system and later a second carrier, similarly identified with an encircled 2, is inserted into the system. Various valving and airflow conditions are described as well as the interlocking operation of automatic terminal 27. Upon the insertion of carrier 1, latch L1 is set, as indicated by the hatching therein. Airflow then proceeds from input/portion 25 through port 47 and blower 41. Flapper valve 50 is pneumatically urged to the illustrated position. Simultaneously air leaves port 31 opening flapper valve 51 in outgoing tube 30.

In terminal 27 sliding gate 53 is closed sealing the terminal from both tubes 26 and 30. (Hatched portions indicate the air blocking relationship while the clear portions indicate openings which when aligned with tubes 26 and 30 permit carrier transport between terminal 27 and the tubes.) With the operational status of FIG. 2, carrier 1 moves until it reaches gate 53. The inertia of the carrier is relied upon to pass vacuum port 47. If port 47 were closer to input portion 25 than gate 53, a pull-push pneumatic operation may be required. Carrier 1 is pneumatically braked at the closed end of input tube 26 between opening 91 and gate 53. Airflow into port 47 closes flapper gate 54 which will be later described when the carrier is transported through terminal 27.

Figure 3:
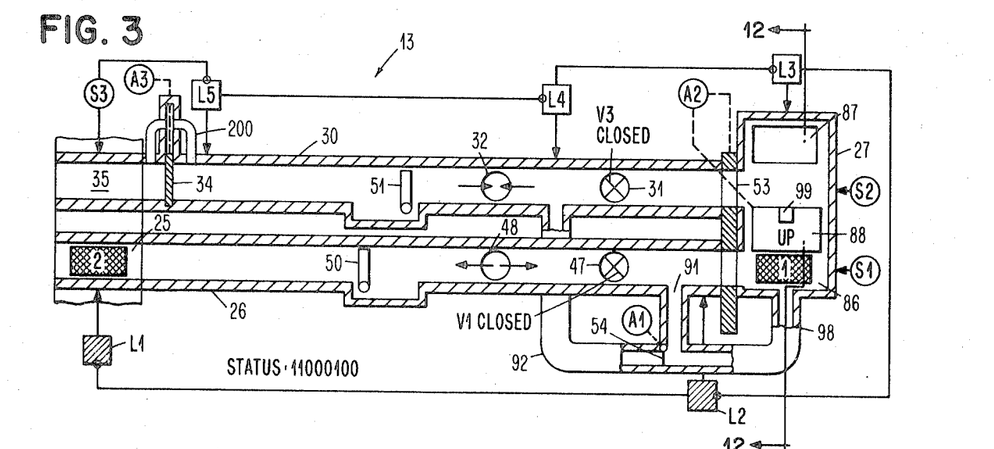

FIG. 3 shows carrier 1 just loaded into terminal 27 with the control devices still actuated for moving the carrier. When carrier 1 arrived at L2, gate 53 was opened (as indicated by the hatched portion) by actuator A2 with valves V1 and V3 closed as indicated by the X's in ports 31 and 47. Valves V2 and V4 are open causing air flowing into tube 26 from port 48, which pneumatically urges carrier 1 into receiving portion 86 of terminal 27. The outflowing air from port 48 moved flapper valve 50 to the closed position. Simultaneously, airflows from output portion 35 through bypass vent 200 toward port 32 urging flapper valve 51 to the closed position. Air for port 32 also comes from terminal 27 through its opening 87 (which is the work position), thence through the opening in gate 53 past closed port 31. When gate 53 is opened by actuator A2, later described, a interacting mechanism moves vertical interposer 88 upwardly thereby preventing carrier 1 from moving past sensor S1 toward sensor S2. When gate 53 is closed, sealing terminal 27 from the pneumatic tubes, vertical interposer 88 moves downwardly permitting carrier 1 to be moved to work position 87.

During this time, flapper valve 50 being closed effectively seals tube 26 from input portion 25. Carrier 2 may then be inserted into input portion 25 actuating latch L1. At this time, both latches L2 and L1 are set. Without carrier 2, latch L1 would have been reset by L2.

Figure 4:
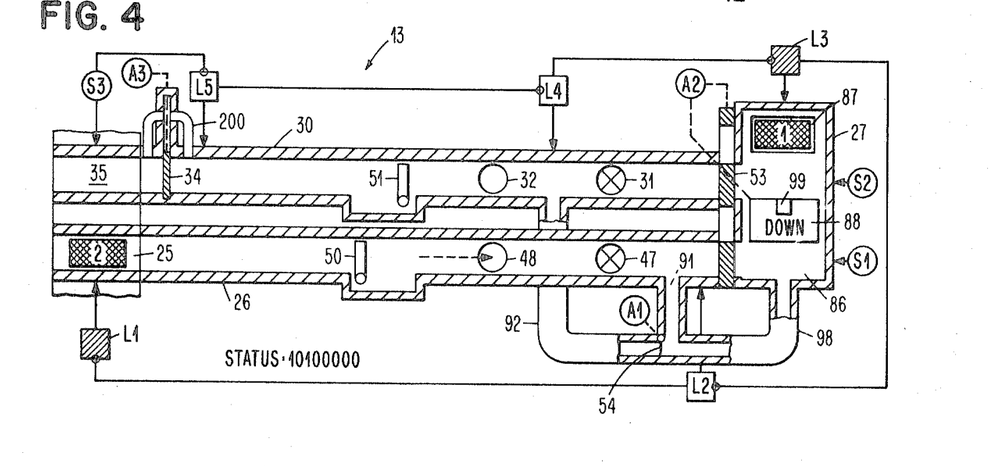

When S1 photoelectrically senses carrier 1 in portion 86, actuator A2 is activated to close gate 53 and simultaneously lower vertical interposer 88. Valves V1–V4 remain as previously described. Pressure from port 48 is provided through tube 91 past flapper valve 54 thence into portion 86 for urging carrier 1 against vertical interposer 88. As soon as interposer 88 is lowered, carrier 1 moves sideways to work position 87 as shown in FIG. 4. At this time, latch L3 is set and latch L2 is reset. Latch L1 remains set because carrier 2 is in input portion 25. Flapper valve 54 now seals tube 91 from tube 92 and hence outgoing tube 30. This latter fluid connection is used for moving a carrier from work position 87 to sensor S2. As carrier 1 moved from position 86 to work position 87, it passed and was photoelectrically sensed by sensor S2. Because sensor S2 is interlocked with an unload command as later described, its signal is ignored.

FIG. 4 shows carrier 1 in work position 87 with carrier 2 still in input portion 25. Latches L1 and L3 remain set indicating that one carrier is in the work position and another is in the input portion.

Flapper valves 50 and 51 remain closed. At this time, it is permissable and desirable to move carrier 2 to gate 53. Valves V1 and V4 open causing airflow through port 47 pulling carrier 2 to gate 53 and latch L2.

Figure 5:
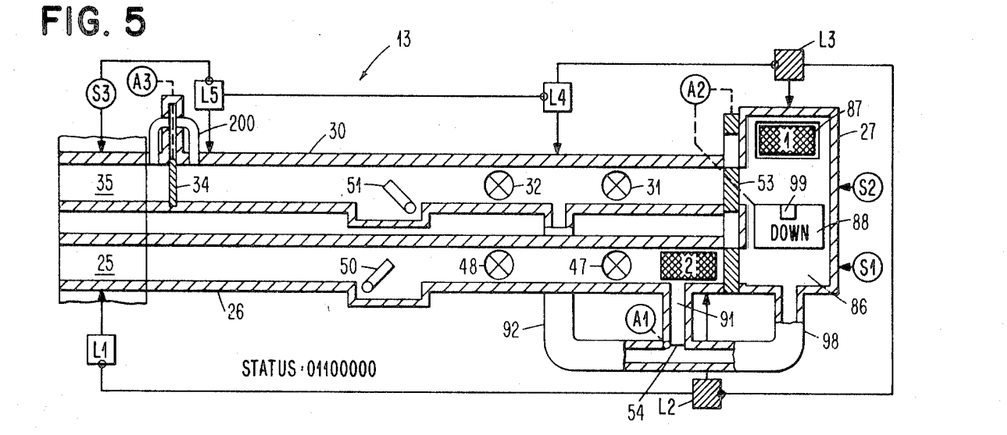

Referring now to FIG. 5, carrier 2 has arrived at latch L2, latch L1 has been reset and valves V1–V4 were closed as indicated by the four X's in the pneumatic ports. Flapper valves 50 and 51 are in random positions (no airflow). The FIG. 5 illustrated operational status remains until article processor 28 (FIG. 1) supplied an unload command to logic circuits of FIG. 9.

Processing may be initiated by a programmed command signal, in response to a carrier arriving at position 87 or a combination of both. Automatic opening carrier 1 and transfer of the article to processor 28 is not important to the present invention and is not described for that reason. An example of such a carrier and article processor is shown in the Badum et al. U.S. Pat. application Ser. No. 790,709, filed Jan. 13, 1969, and assigned to the present assignee. Terminal 27 of this application can be substituted for item 100 in the Badum et al. application.

Figure 6:
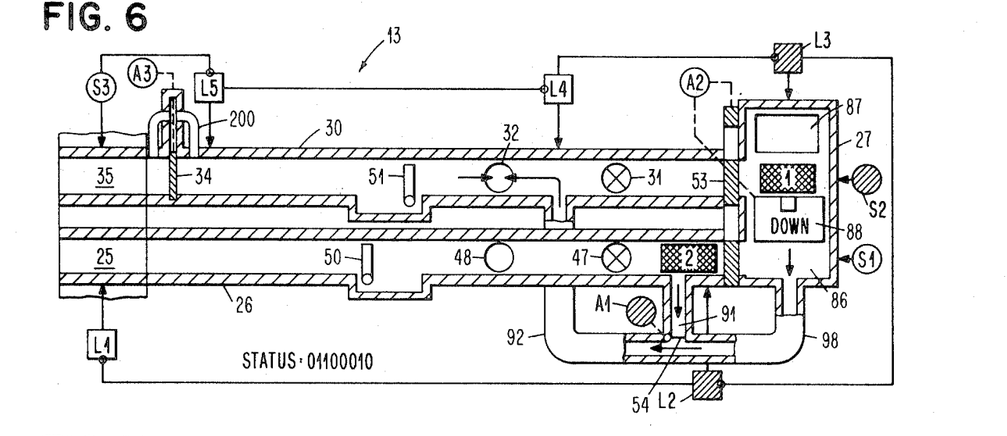

FIG. 6 shows status immediately after receipt of an unload command. Valves V2, V4 are open. S2 is enabled until A2 is actuated to open gate S3. Latches L2 and L3 are set and carrier 1 has been moved to a position aligned with outgoing tube 30. Carrier 1 was pneumatically pulled from work position 87 by a vacuum flow through the terminal, hence outwardly through tubes 98 and 92 and thence through port 32. At this time, actuator A1 was activated to prevent flapper valve 54 from moving from a tube 91 blocking position to a tube 92 blocking position. As soon as carrier 1 arrives at S2, actuator A1 is released permitting flapper valve 54 to be moved in accordance with airflow. A horizontal interposer 99, later described, stops carrier 1 in front of S2. Next actuator A2 opens gate 53 which disables S2.

Valves V2 and V3 remain open. Airflow is from terminal 27 through port 32 outwardly and simultaneously from port 48 into terminal 27. Therefore, carrier 1 leaves terminal 27 simultaneously with carrier 2 entering terminal 27. Action is rapid.

Figure 7:
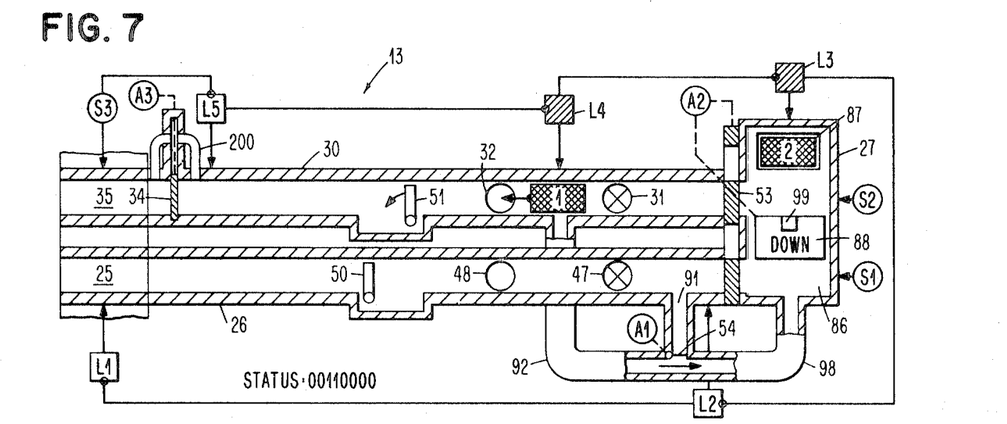

FIG. 7 shows the next operational state with carrier 1 sensed by latch L4 and latch L3 reset. Carrier 2 was moved through terminal 27 to work position 87 setting latch L3 and resetting latch L2. Since the unload command has been satisfied by carrier 1 leaving terminal 27, the signal in S2 caused by carrier 2 was ignored. Remember that tube 91 and 98 will carry air from port 48 to urge carrier 2 from input position 86 toward work position 87. Interposer 88 operated as previously described. Upon arrival of carrier 2 at 87, valves V2 and V4 were closed (indicated by the X's in ports 32 and 48). Valves V1 and V3 are open causing airflow into tube 30 from port 31 which opens flapper gate 51 and simultaneously urges carrier 1 toward L5. Air ahead of carrier 1 moving through tube 30 escapes to output section 35 through bypass tube 200. Carrier 1 is pneumatically braked at the closed end of output tube 30 between the port for bypass vent 200 and gate 34.

Figure 8:
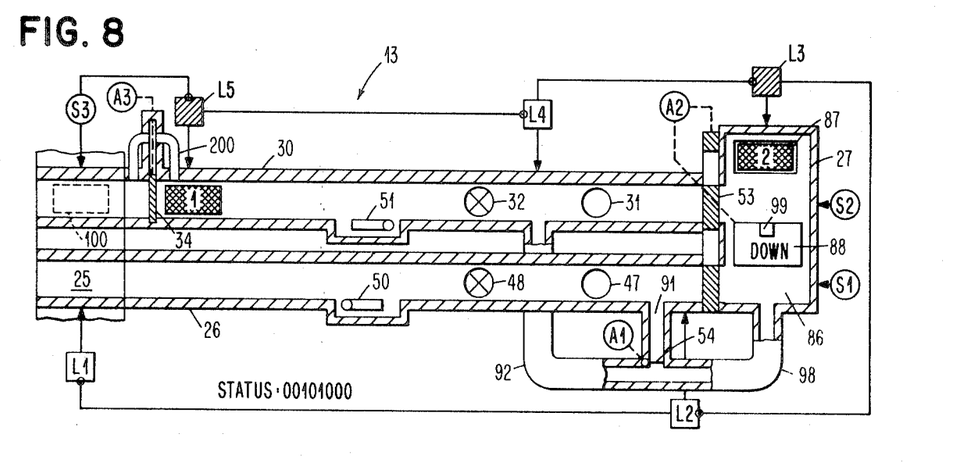

FIG. 8 shows carrier 1 having arrived at and set latch L5 with latch L4 being reset. Carrier 2 remains in the work position 87 with latch L3 set. As soon as L5 is set, actuator A3 opens gate 34 closing bypass vent 200. Valves V1 and V3 remain open until gate 34 has opened and carrier 1 has actuated sensor S3 resetting latch L5. Then valve V1 and V3 are closed terminating airflow through ports 31 and 47. When carrier 1 is in output position indicated by dotted box 100, only latch L3 remains set and the carrier exchanging is signalled through control circuits 20 to remove carrier 1.

From the above description, it should be apparent that numerous carriers can be simultaneously handled. For simplifying the control circuits and reducing costs, the number of carriers to be simultaneously handled has been arbitrarily limited to three. The status of the carriers indicated by L1 through L5 and S1 through S3, of course, would be changed and indicate the number of carriers residing in the system at any given instant. In the event of power off, these latches remain set such that during power up the situation could be immediately sensed and the control circuits 72 immediately set the proper valves and/or actuators for processing the numerous carriers. Also, for example, if any carrier was between L4 and L5, L4 will remain set even though a carrier is not in juxtaposition to its sensor. Insofar as programmed library operation is concerned, the exact position of the carrier in output tube 30 is insignificant. That is, in any such event valve V3 is opened causing air to flow through port 31 urging such a carrier to L5.

The Tracking Status Byte

The table below indicates the manner in which the information contained in latches L1–L5 and sensors S1–S3 plus the action to be taken next by initial circuits 20 is derived. The format of a typical status byte is:

L1, L2, L3, L4, L5, S1, S2, S3 (1)

Each dual character L1...S3 is a "1" or a "0;" "1" indicates the corresponding device is active and a "0" that it is inactive. Each of the FIGS. 2–8 have a sense byte indicating the operational status. The byte 10000000 indicates the carrier is in input portion 25 with latch L1 being active. In the table, a "1" indicates a valve is open, a "0" indicates a valve is closed; or actuators are respectively active and inactive. Letter "C" means a carrier.

TABLE I

| Sense Byte | Status, C at— | V1, V3 | V2, V4 | A1 | A2 | A3 |
|---|---|---|---|---|---|---|
| 00000000 | No C's | 0 | 0 | 0 | 0 | 0 |
| 10000000 | 25 | 1 | 0 | 0 | 0 | 0 |
| 01000000 | 53 | 0 | 1 | 0 | 1 | 0 |
| 01000100 | 86 | 0 | 1 | 0 | 0 | 0 |
| 00100000 | 87 | 0 | 0 | 0 | 0 | 0 |
| 00100010 | S2 | 0 | 1 | 1 | 1 | 0 |
| 00010000 | L4 | 1 | 0 | 0 | 0 | 0 |
| 00001000 | 33 | 1 | 0 | 0 | 0 | 1 |
| 00000001 | 35 | 0 | 0 | 0 | 0 | 0 |

Note.—Assume reset of L5 is immediate.

Figure 10:
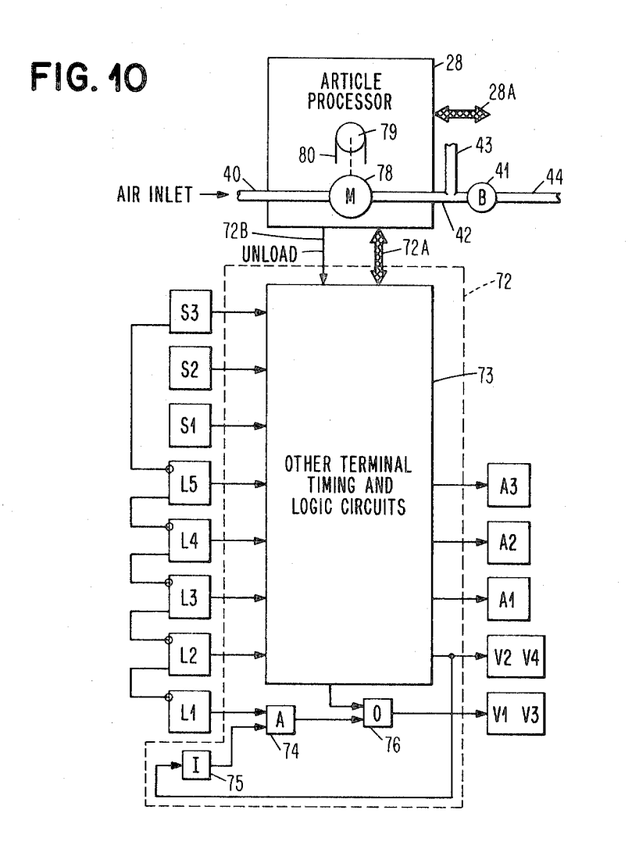
FIG. 10 is a simplified logic control circuit arrangement usable to control the FIG. 1 illustrated system.

For two or more carriers the combinations do become more complex in that the status byte contains more 1's. The logic system of FIG. 10 is readily designed to accommodate such added complexity. The table is expandable in accordance with a particular logic of design and is not extended here because of several design choices available. For the simple control system to handle three carriers, there are about 70 different permutations of the status bytes.

Details of Dispatch Control Devices

Figure 9:
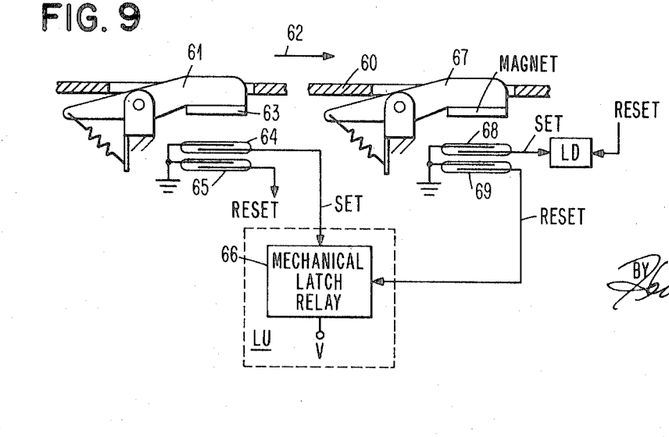
FIG. 9 is a simplified diagrammatic illustration of a sensing latch usable with the FIG. 1 illustrated system.

Latches L1 through L5 are explained in detail with respect to FIG. 9. Shown are two latches LU and LD for upstream and downstream, respectively. Bottom wall 60 is a portion of a pneumatic tube. Pivoted arm 61 extends through an aperture in wall 60 for sliding engagement with any carrier passing in the direction of arrow 62. When the carrier depresses arm 61, permanent magnet 63 actuates reed switches 64 and 65 to complete two electrical circuits. Switch 64 is connected to mechanical latching relay 66 in latch LU and sets same to the active condition. Relay 66 mechanically latches and maintains such state irrespective of a continuing electrical power supplied thereto. The fact that a carrier has passed over arm 61 is electromechanically recorded within relay 66. Reed switch 65 completes an electrical circuit to another relay (not shown) for resetting same from the first or active state to complete the indication that a carrier has left a segment of the path between LU and a latch (not shown) further upstream. As the carrier passes over second arm 67, reed switch 69 closes supplying a resetting signal to relay 66. Relay 66 unlatches to indicate that the carrier has left the segment of the path of travel between arms 61 and 67. Simultaneously reed switch 68 completes an electrical circuit setting latch LD which in turn is reset by another latch further downstream in the path of travel. All latches L1–L5 are similarly constructed. It is apparent that other forms of permanent recording latches may be used with the present system.

The logic which is responsive to the latches L1–L5 and sensors S1–S3 for actuating actuators A1–A3 and valves V1–V4 is briefly explained with respect to FIG. 10. Sensors S1–S3 supply signals to logic circuits 72. These circuits may be physically located in article processor 28. For brevity, only a few detail logic circuits are shown, understanding that the other logic circuits indicated in box 73 are similarly constructed and are designed in accordance with the sequences described in this specification. Such design is well within the capability of a logic designer of ordinary skill. The status information supplied by the sensors L1–L5 and S1–S3 is interpreted by the logic of circuit 72 as set forth in table I to actuate A1–A3, V1, V3 and V2, V4. Shown in detail is the actuation of valves V1, V3. "AND"-circuit 74 is jointly responsive to L1 being set and a signal from invertor circuit 75 indicating that V2, V4 are not activated to supply a valve opening signal through OR-circuit 76. In this logic, valves V2, V4 being open have taken priority over opening valves V1, V3. This interlocking and assigning priority to valves V2, V4 is a matter of design choice and is used to illustrate that various design choices may be utilized practicing the present invention. The interconnection of L1–L5 and S3 is the tracking circuit arrangement described in FIGS. 2–8. Logic circuits 73 include a plurality of circuits as needed. The unload signal on line 72B from processor 28 is combined with the S2 signal as has been described.

Also shown in FIG. 10 is a simplified diagram of article processor 28 showing air inlet 40 supplying air through motor 78 and being exhausted via line 42 by blower 41 (FIG. 1). Motor 78 is shown as being operatively connected to capstan 79 over which flexible web 80 is disposed. Web 80 may have a iron oxide coating for receiving recording signals. Article processor 28 is then an automatically loaded and unload record media handler. Cable 72A shows other control circuit connections between circuits 72 and processor 28, and those connected to cable 28A to control circuits 20 (FIG. 1).

Figure 11:
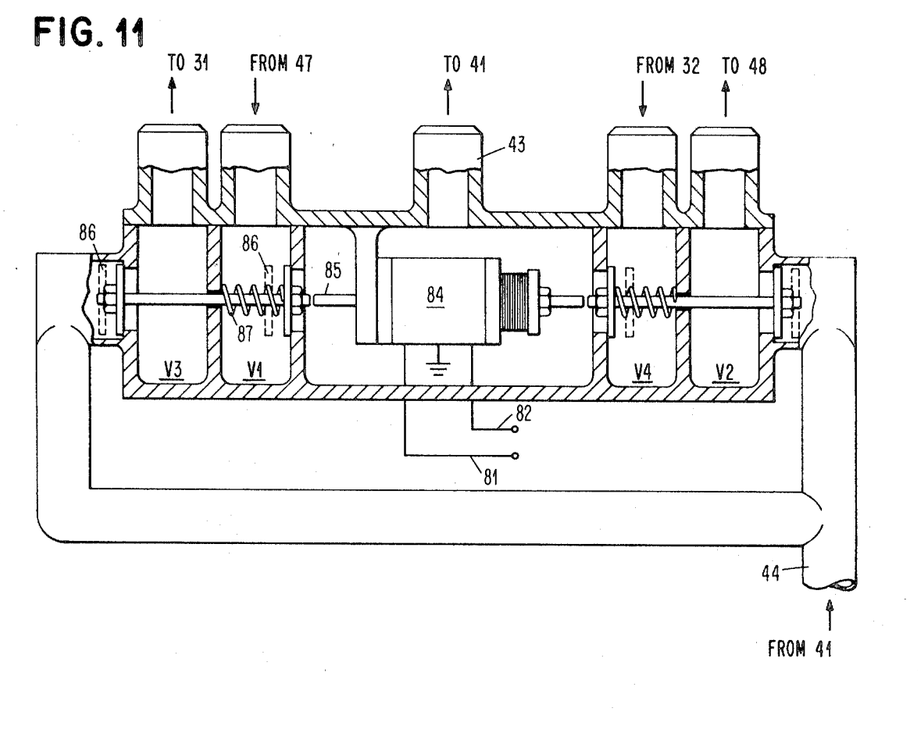
FIG. 11 is a diagrammatic illustration of a four valve assembly used to control the FIG. 2 illustrated system.

A single actuator valve assembly V1–V4 is shown in FIG. 11. The common V1, V3 and V2, V4 valve actuators are connected with lines 82 and 83 for receiving control signals from the FIG. 10, illustrated circuits. Voice-coil-type actuator 84 has two coils therein respectively connected to the two lines. When one coil is actuated, center plunger 85 moves to the left opening valves V1 and V3 as indicated by dotted lines 86. When the actuating coil is deenergized, airflow aided by spring 87 closes valves V1, V3. Valves V2 and V4 are similarly constructed and operate in the same manner when the signal on line 82 actuates the other coil to move center plunger 85 to the right. When actuator 84 is deenergized all valves are closed.

Figure 12:
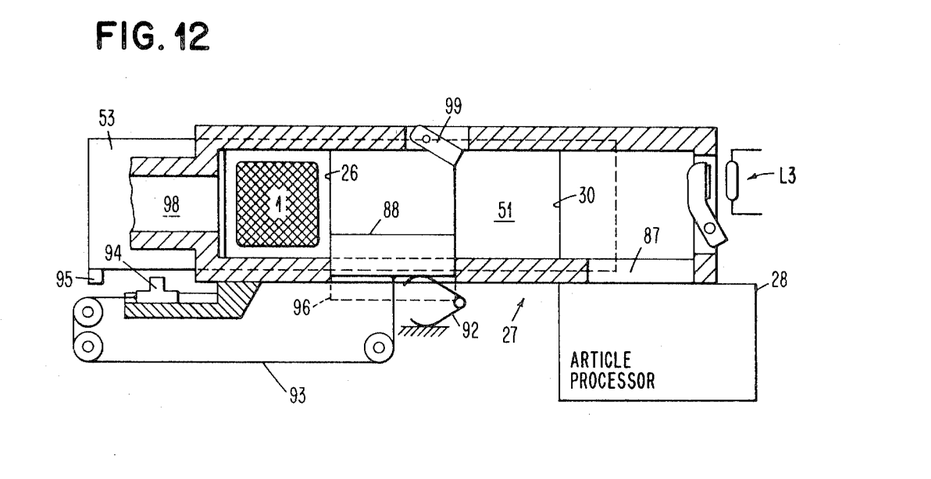
FIG. 12 is a simplified block diagram of logic control circuits usable to operate the systems illustrated in FIGS. 1–8.

The construction of terminal 27 is now briefly explained with respect to FIG. 12. FIG. 12 is a partial diagrammatic cross-sectional view taken in the direction of arrows along line 12—12 in FIG. 3. With gate 53 open, interposer 88 is in its upward position. Interposer 88 is urged upwardly by spring 92. Gate 53 is operatively connected to interposer 88 via cable 93. When gate 53 closes (moves to the right), pawl 95 engages sliding member 94 pulling cable 93, hence moving vertical interposer 88 to dotted line position 96, the down position. When gate 53 moves to the left, cable 93 is released such that spring 92 urges interposer 88 upwardly.

When unloading a carrier from work position 87 to be inserted into outgoing tube 30, a vacuum is applied from tube 98, pulling the carrier (not shown) to the left. Gravity actuated horizontal stop 99 engages the upper sidewall of the carrier (not shown) and prevents it from moving further to the left. It is now precisely aligned with outgoing tube 30. The gate 53 is then opened applying vacuum to outgoing tube 30 urging it down the tube toward latch L4 as previously explained.

The actual constructional features described in this last section are not necessary to practice the present invention. Also, rather than a pneumatically operated terminal 27, a mechanical system can be easily used. Such a mechanical system could be a three-position linear Geneva. The Geneva mechanism will provide a detented position for each tube 26 and 30 plus another for work position 87. In this latter arrangement only one carrier is in terminal 27 at a given instant. That is, a carrier in tube 26 at gate 53 would not enter terminal 27 until after a carrier therein was exited to tube 30. Of course, other design choices may be used well within the scope of the present invention.

While the invention has been particularly shown and described with reference to preferred embodiments thereof, it will be understood by those skilled in the art that various changes in form and details may be made therein without departing from the spirit and scope of the invention.

What is claimed is:

1. An article carrier tracking system for tracking along a path of travel;
  including in combination;
  a plurality of latch means disposed along said path of travel dividing said path into tracking segments and each responsive to a passing carrier in said path to latch in a first state, each latch means maintaining said first state in a no-work condition;
  means in each latch means responsive to said latch means being in said first state to supply a latch releasing signal to the immediately upstream latch means;
  each upstream latch means being responsive to the respective releasing signals from one downstream latch means to release said first state and assume a second state; and last means for releasing said most downstream latch means.

2. The system of claim 1 wherein said path of travel comprises an input let, a terminal leg having a work position and an output leg;
  the improved combination further including;
  first and second latch means in said first leg respectively indicating a carrier having entered and ready to leave said first leg;
  third latch means in said terminal leg indicating a carrier in said work position;
  fourth and fifth latch means in said output leg respectively indicating a carrier entering and ready to leave said output leg, said fifth latch means being the most downstream latch means.

3. The system of claim 2, wherein said input leg has an input portion and said output leg has an output portion for temporarily storing a carrier, said first latch means sensing a carrier in said input portion and said fifth latch means sensing a carrier ready to enter said output portion;
  said last means including carrier sensing means in said output portion responsive to a carrier therein to supply a releasing signal to said fifth latch means.

4. The system of claim 2, further including momentary sensing means along said terminal leg for monitoring carrier travel therealong and logic means and said second and third latch means to perform a function indicating carrier movement.

5. The system of claim 2 further including carrier movement control means responsive to said function being performed to effect transfer of said carrier to said output leg from said terminal leg and not trying to effect such transfer of the absence of such function.

6. The system set forth in claim 2, wherein said tracking system is operatively associated with a pneumatic-dispatch system, said input leg is an input pneumatic tube, said output leg is an output pneumatic tube, and said terminal leg includes means for transferring a carrier from said input to said output leg,
  control means for controlling said pneumatic-dispatch system including selectively actuatable valve means in communicative relationship to said input and output legs, and
  means responsive to said latches being in said first state to selectively actuate said valves for coordinating carrier transfer through the system.

7. The system set forth in claim 6, further including carrier presence-sensing means in said terminal leg and means responsive to said presence-sensing means and to said latch means for supplying electrical signals indicative of the carriers in the system, and
  said control means being further responsive to said presence-indicating signals for effecting transfer of carriers through said terminal leg.

8. The apparatus set forth in claim 7, wherein said control means is responsive to said latch means for actuating said valve means for simultaneously operating both of said input and output legs irrespective of carriers therein so long as at least one carrier is in one of said legs.

9. A pneumatic carrier transporting and tracking system including in combination:
  incoming and outgoing pneumatic tubes each having a transfer portion at one end;
  carrier terminal operatively connected to said tubes at opposite ends from said portions for exchanging article containing carriers with said tubes and having a work station location;
  an article processing station operatively associated with said terminal for automatically operating on an article carried to said location by a carrier;
  a plurality of latch means including condition indicating means disposed along said tubes and said carrier terminal forming tracking segments therebetween, each latch means being responsive to a passing carrier to assume a first stable condition and reset the last latch means passed by a carrier;

last means in said output tube transfer portion responsive to a carrier entering such transfer portion to reset a last-passed latch means by such entering carrier;
pneumatic means supplying carrier urging fluid to said input and output tubes respectively remote from and adjacent said terminal; and
control means receiving said latch means indications and responsive to said article processing station and said indications to control said pneumatic means and said terminal for effecting simultaneous carrier urging in said tubes and operation of said terminal to exchange carriers with said tubes for effecting a circuitous carrier transfer between input to output transfer portions.

* * * * *